A. SMITH.
Grain Separator.
No. 5,509.
Patented April 11, 1848.
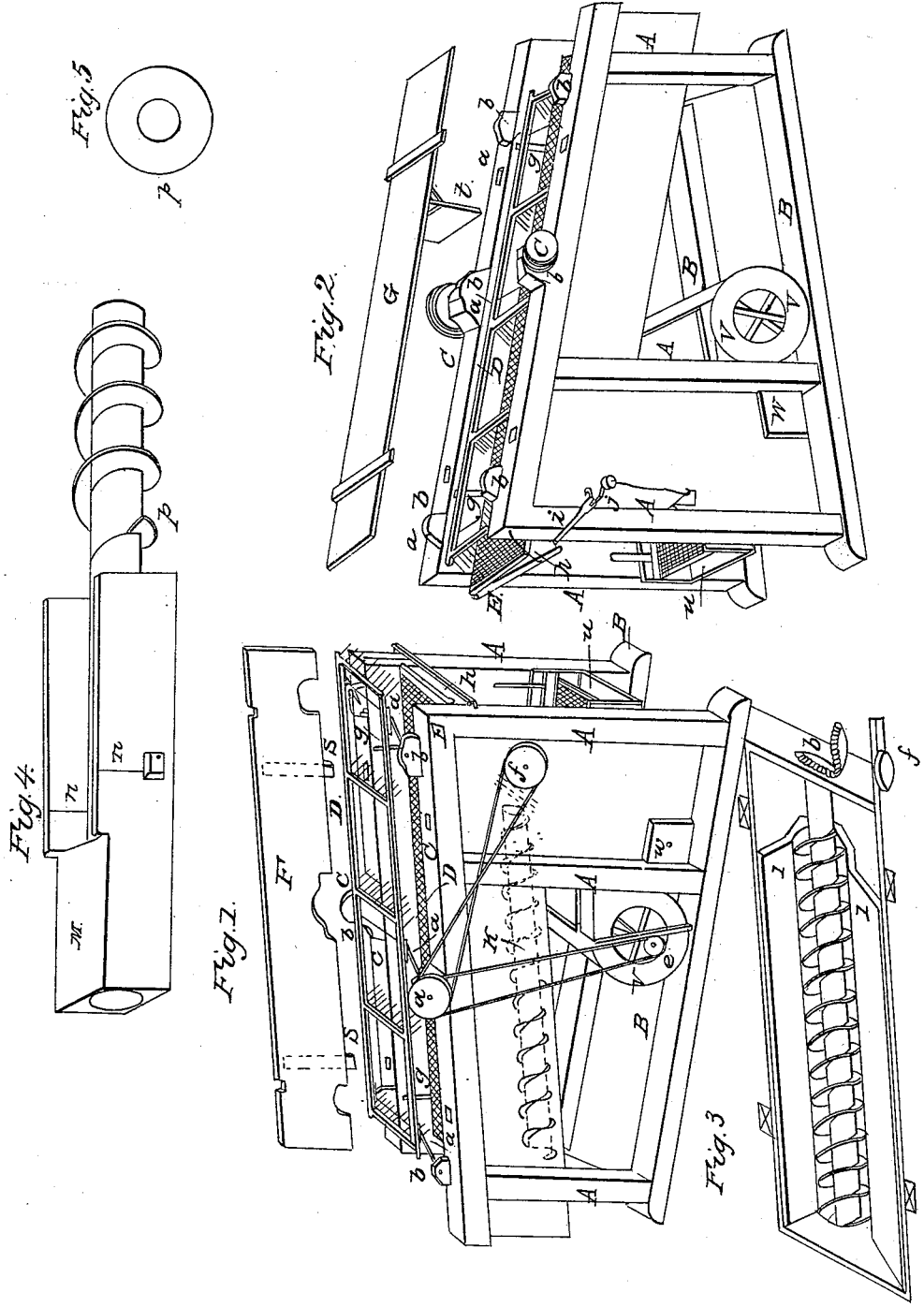

UNITED STATES PATENT OFFICE.

AARON SMITH, OF BIRMINGHAM, MICHIGAN.

GRAIN-SEPARATOR.

Specification of Letters Patent No. 5,509, dated April 11, 1848.

*To all whom it may concern:*

Be it known that I, AARON SMITH, of Birmingham, in the county of Oakland and State of Michigan, have invented a new and Improved Grain-Separator to Separate after Threshing the Grain from the Straw; and I hereby declare the following to be a full and accurate description thereof.

The machine is constructed in connection with the ordinary fanning mill; and the improvement consists in the use of a revolving rake for handling the straw, a screen through which the grain passes, and is separated from the straw heads, and much of the chaff, and a conveyer which receives and carries the grain to the fanning mill.

Figures 1 and 2 are views from opposite points of a working machine.

A A are posts of the frame of which there are three upon each side.

B, B, are the sills and C C the rails.

D D is the rake, the frame of which consists of two light side pieces and five heads or cross pieces of wood, in each of the latter of which, there is a row of teeth of large wire, the teeth having a slant forward as is usual with rake teeth. The rake revolves upon three cranks *a a*, each of which runs in a set of boxes *b b*, attached to the rails of the frame. Upon one end of the central crank there is a pinion *c* to which is applied the power, by a band from the thresher, for driving the machine. And upon the opposite end there is a pinion *d* from which motion is communicated by a band to pinion *e* on the shaft of the fan, and by a band to pinion *f* on the shaft connected with the screen and the conveyer. Pinions *d* and *f* are of the same diameter. The diameter of the crank revolution is 12 inches; but this and other parts should be varied if the size of the machine is varied.

E, E, is the screen, consisting of a light wood frame covered with wire gauze, with about ⅜-inch openings. It is suspended in place by four pendulum plates or rods *g g* of which there are two upon each side, each near the end and opposite to the one corresponding on the other side. Upon these plates, vibrating from a pin in the side of the machine at top and attached by a pin to the screen at bottom, the screen has a pendulous motion, being acted upon by a lever *h* which receives its motion through a pitman *i* from the crank *j* on the opposite end of the shaft driven by pinion *f*. The curvature in which the screen vibrates is one-fourth greater than that in which the rake revolves. The screen swings up the plane as the rake rises and passes backward and down the plane as the rake settles into the straw and moves forward. The rake acts by a steady and rapid succession of strokes upon the straw, beating shaking and throwing it forward, loosening and stirring it in such manner, that the grain clears it freely; while the screen swinging backward as the rake moves forward and vice versa, causes, by this arrangement of motion, the grain to be spread more equally over it and to pass consequently more freely through it. The motion of the rake and the screen combining as described and keeping up a steady and lively movement of the straw, carries off the loose heads and the greater part of the chaff, which greatly relieves the fanning mill and enables it to do its work in a better manner.

The conveyer consists of a box and a shaft carrying a thread like a screw. It lies directly beneath the screen, allowing room above it only for the screen to vibrate. The skeleton screw seen at K, Fig. 1, shows its position. It is fully presented in Fig. 3, which is a cross section of the machine, just beneath the screw. The trough of the box which receives the shaft is semicylindrical the diameter of the box being only so much greater than that of the thread as will allow the latter to revolve freely. From the edge of the cylindrical portion on the side the box rises with a sloping surface *l l* and attaches to the sides of the machine, just beneath the screen, the slope of the sides being such as will give room for free action of the conveyer without interfering with that of the screen. The shaft of the conveyer is of wood and the thread of sheet iron; the former I make four inches in diameter and the latter three inches deep. The manner of preparing the shaft for the thread is shown in Fig. 4.

M is a box formed to receive the shaft. A saw gain mitering in such manner as will give the right run of the thread is cut in the box at *n n*. An iron point at block *o* projects within the box and acts as a guide. A shaft turned to the given size is placed in the box, elevated at the inner end so as to clear the guide, and a saw gain a trifle wider than the thickness of the iron to be used for the thread, started on the end. The shaft is then let down with the guide entered in the gain and the gain cut through the required length at a depth of about one inch. The action of the guide with the saw working true in the miter gives a perfectly even run of the gain. Circular pieces are then cut in the form shown by Fig. 5, with a press tool from sheet iron. Each piece is opened by a radial cut as at $p$ and the ends are spread apart equal to the run of the gain upon the shaft. One end of the piece is entered in the gain and with a slight tapping of a hammer the piece is run upon the shaft. Successive pieces are worked upon the shaft in this manner until the thread is complete the length of the gain and a suitable nail is driven in the gain at the end of the thread, which holds the last pieces from working off. If the thread is loose in any part, which will not be the case if the gain is of the right width, it is tightened by driving a shingle nail here and there by the side of it. Fig. 4 shows a shaft in the box with the gain cut and a part worked on it.

The shaft of the conveyer Fig. 3, runs upon iron journals and receives motion through the bevel-cog-wheels at $q$ from shaft $r$ which is driven by pinion $f$. The length of the shaft carrying the thread is equal to the length of the conveyer box, which is such that from its upper end, the gain will drop upon the shoe of the sieve frame of the fanning mill. The conveyer works with an even steady feed carrying the grain without the waste of a kernel to the fanning mill. It works very light, is as durable as the machine itself, and is never liable to get out of repair.

The rake is inclosed in a box, consisting of two side pieces and a top piece.

F, Fig. 1, is one of the side pieces. It is cut out at three points in the lower edge to fit to the boxes $b$ $b$ $b$; and has on the outside two cleats which enter as tenons in mortises in the top of the rail C and hold the side pieces in place.

G is the top part of the box. It has a board $t$ projecting down from it between the heads of the rake, which serves as a beater to throw down the grain as it flies from the threshing machine. It is made also with two cleats on the outside, having a slight gain cut in the ends of each which enter by interlocking the gains in the top of the side pieces.

$u$ is the sieve frame of the fanning mill which is in the usual form.

$v$ is the fan box and $w$ the box for receiving the grain.

Some of the dimensions of a machine are width inside $2\frac{1}{2}$ feet, screen $\frac{1}{4}$ in. less; length of rail 8 feet $1\frac{3}{4}$ inches; length of rake 6 feet; length of screen 8 feet; elevation of high and of screen $1\frac{1}{2}$ feet; length of crank of rake 6 inches and length of pendulum plate 8 inches.

Having described my machine, what I claim therein as new and desire to secure by Letters Patent, are—

1. I claim the revolving rake, constructed and operating as described, for shaking up and separating the straw and the grain, and carrying the straw through the machine.

2. I claim the motion of the screen in combination with that of the rake its motion being pendulous and in reverse direction to that of the rake as described.

AARON SMITH.

Witnesses:
 EZRA P. BALDWIN,
 JOHN T. RAYNOR.